(12) United States Patent
Amemura

(10) Patent No.: US 9,009,376 B2
(45) Date of Patent: Apr. 14, 2015

(54) ELECTRONIC DEVICE AND ELECTRONIC DEVICE SYSTEM

(75) Inventor: Tatsuaki Amemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/350,011

(22) PCT Filed: Jul. 27, 2012

(86) PCT No.: PCT/JP2012/069124
§ 371 (c)(1),
(2), (4) Date: Apr. 4, 2014

(87) PCT Pub. No.: WO2013/051324
PCT Pub. Date: Apr. 11, 2013

(65) Prior Publication Data
US 2014/0229642 A1    Aug. 14, 2014

(30) Foreign Application Priority Data

Oct. 6, 2011 (JP) ................. 2011-222297

(51) Int. Cl.
*G06F 13/38* (2006.01)
*G06F 13/10* (2006.01)
*G06F 11/14* (2006.01)
*G06F 3/06* (2006.01)

(52) U.S. Cl.
CPC .............. *G06F 13/10* (2013.01); *G06F 13/385* (2013.01); *G06F 11/1417* (2013.01)

(58) Field of Classification Search
None
See application file for complete search history.

(56) References Cited

U.S. PATENT DOCUMENTS

| 5,473,775 A | 12/1995 | Sakai et al. |
| 2003/0221096 A1 | 11/2003 | Wada |
| 2008/0250172 A1 | 10/2008 | Tanaka |
| 2013/0262847 A1* | 10/2013 | Zou et al. ................. 713/2 |

FOREIGN PATENT DOCUMENTS

| JP | 5-216639 A | 8/1993 |
| JP | 2003-345617 A | 12/2003 |
| JP | 2006-215958 A | 8/2006 |
| JP | 2008-52354 A | 3/2008 |
| JP | 2008-276725 A | 11/2008 |

OTHER PUBLICATIONS

"USB Memory Kanzen Katsuyo" No. 633, Nikkei Personal Computing, Sep. 12, 2011 pp. 44 to 47.

\* cited by examiner

*Primary Examiner* — Scott Sun
(74) *Attorney, Agent, or Firm* — Birch, Stewart, Kolasch & Birch, LLP

(57) ABSTRACT

A BIOS storage unit of an electronic device is connected to a USB 3.0 extension unit of a USB 3.0 host connector. A microcomputer of a USB compatible device is connected to a USB 3.0 extension unit of a USB 3.0 device connector. The microcomputer of the USB compatible device can write and read the BIOS data to/from the BIOS storage unit of the electronic device through the USB 3.0 extension units. Moreover, the microcomputer of the USB compatible device compares the BIOS data read from the BIOS storage unit of the electronic device with the BIOS data stored in its own storage unit, and notifies a result of the comparison.

6 Claims, 2 Drawing Sheets

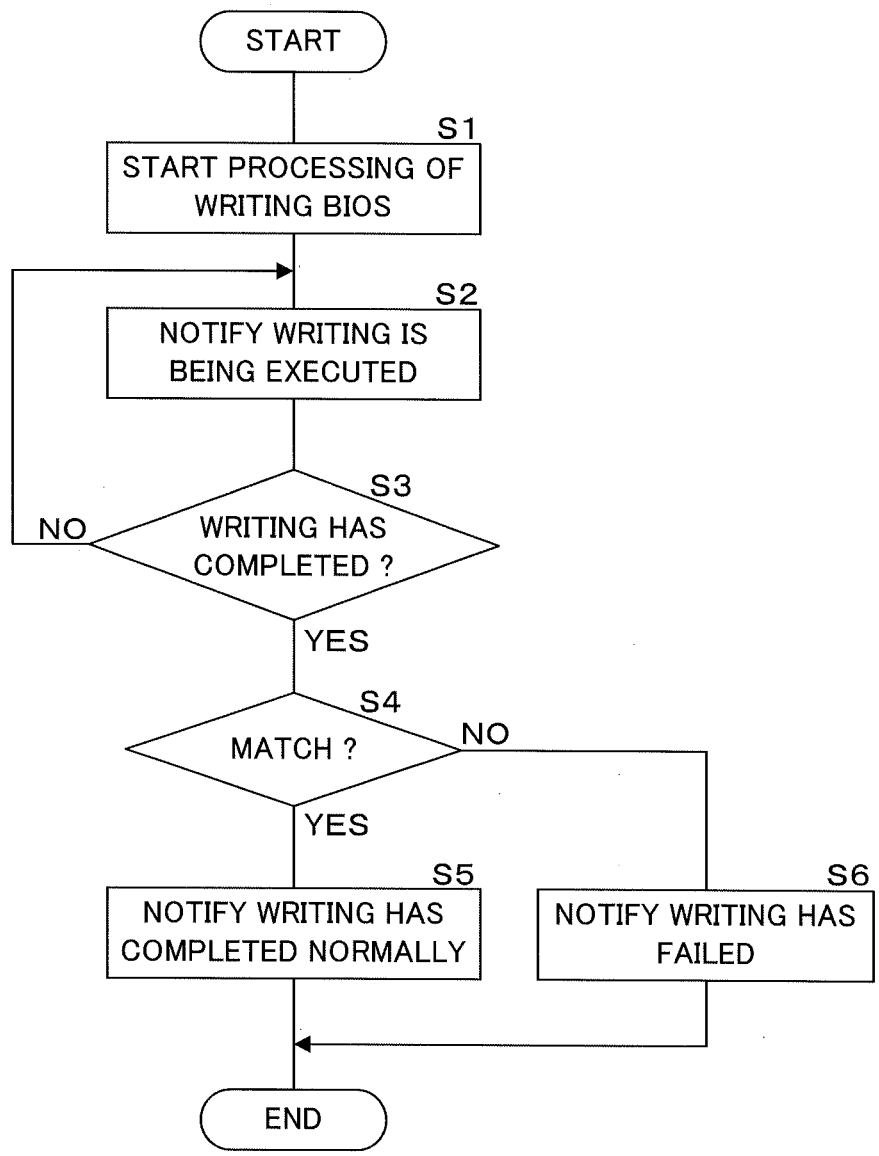
F I G. 2

ELECTRONIC DEVICE AND ELECTRONIC DEVICE SYSTEM

CROSS-REFERENCE TO RELATED APPLICATIONS

This non-provisional application is a National Stage entry under U.S.C. §371 of International Application No. PCT/JP2012/069124 filed on Jul. 27, 2012, which claims priority to Japanese Patent Application No. 2011-222297 filed in Japan on Oct. 6, 2011. The entire contents of all of the above applications are hereby incorporated by reference.

BACKGROUND

1. Technical Field

The present invention relates to an electronic device that is equipped with a USB (Universal Serial Bus) connector as well as an electronic device system that includes the electronic device.

2. Description of Related Art

For a general computer to start, BIOS (Basic Input/Output System) is required, and BIOS-ROM in which BIOS is written is mounted on a mother board for the general computer.

In such the computer, when the contents stored in the BIOS-ROM are destroyed or when BIOS is upgraded, it is possible to restore or upgrade the BIOS by replacing the BIOS-ROM.

Japanese Patent Application Laid-Open No. H05-216639 proposes a personal computer in which BIOS can be restored or upgraded by rewriting the contents stored in the BIOS-ROM, using a flash memory for BIOS-ROM without the need of replacing the BIOS-ROM. The personal computer disclosed in Japanese Patent Application Laid-Open No. H05-216639 is capable of rewriting the contents stored in the BIOS-ROM in the normal state after the power is turned on.

SUMMARY

The mother board can, however, not be started when BIOS-ROM is in a blank state. Thus, the OS (Operating System) that is mounted on the computer cannot be started, and therefore the computer is not able to perform normal operations. In other words, BIOS cannot be written to the BIOS-ROM that is in a blank state. As a result, it became necessary to mount the BIOS-ROM where the BIOS is written beforehand, on the mother board. Furthermore, when the contents stored in the BIOS-ROM are destroyed to such an extent that the computer (mother board) cannot be started though BIOS has been written in the BIOS-ROM, it is not possible to rewrite the contents stored in the BIOS-ROM.

The present invention has been made with the aim of solving the above problems. It is an object of the present invention to provide an electronic device and an electronic device system where data can be written to BIOS-ROM even when BIOS-ROM is in a blank state or when the contents stored in the BIOS-ROM are destroyed to such an extent that the electronic device (computer) cannot start.

An electronic device of the present invention is an electronic device including: a USB connector for a USB 3.0 interface having nine terminals from a first terminal to a ninth terminal; and a storage unit for storing BIOS data. The storage unit is configured to be accessible from an external device through at least one terminal among the fifth to the ninth terminals in the USB connector.

According to the present invention, the electronic device includes the USB connector of the USB 3.0 standard, and the USB connector has nine terminals from the first terminal to the ninth terminal. The electronic device includes the storage unit for storing BIOS data, and the storage unit is configured to be accessible from the external device through at least one terminal among the fifth to the ninth terminals of the USB connector. Therefore, the BIOS data can be written to the storage unit by using the external device. Moreover, since the BIOS data is written by using one or multiple terminals among the fifth to the ninth terminals of the USB connector, the compatibility with the USB standard is maintained.

An electronic device of the present invention is an electronic device including a USB connector for a USB 3.0 interface having nine terminals from a first terminal to a ninth terminal. The electronic device includes: a data storage unit storing BIOS data; and a sending-out unit that sends out the BIOS data stored in the data storage unit to an external device through at least one terminal among the fifth to the ninth terminals in the USB connector.

According to the present invention, the electronic device includes the USB connector of the USB 3.0 standard and the USB connector has nine terminals from the first terminal to the ninth terminal. The electronic device can send out the self-stored BIOS data to the external device through at least one terminal among the fifth to the ninth terminals of the USB connector. The BIOS data is sent by using one or multiple terminals among the fifth to the ninth terminals of the USB connector, thus compatibility with the USB standard is maintained.

The electronic device of the present invention may further include a judgment unit that judges whether or not the BIOS data acquired from the external device matches with the BIOS data stored in the data storage unit.

According to the present invention, the electronic device compares the BIOS data acquired from the external device with the self-stored BIOS data, and judges whether they match. Therefore, the process execution is possible based on the judgment result and execution of the unnecessary processing can be suppressed by, for example, sending out the self-stored BIOS data to the external device only when both the BIOS data do not match.

The electronic device of the present invention may further include a notification unit that notifies a judgment result by the judgment unit, or whether or not the sending-out unit is sending out the BIOS data stored in the data storage unit to the external device.

According to the present invention, the electronic device notifies the result of comparison between the BIOS data acquired from the external device and the self-stored BIOS data, or the fact that the self-stored BIOS data is being sent out to the external device. Therefore, the user can grasp easily the operating state of the electronic device, the propriety of the BIOS data stored in the external device, and so forth.

The electronic device of the present invention may further include a receiving unit that receives a specification instruction for processing to be performed, among processing including processing of sending out the BIOS data stored in the data storage unit to the external device, and processing of judging whether or not the BIOS data acquired from the external device matches with the BIOS data stored in the data storage unit.

According to the present invention, the electronic device receives the instruction for processing to be performed, among the processing including the processing of sending out the self-stored BIOS data to the external device, and the processing of comparing the BIOS data acquired from the external device with the self-stored BIOS data. Therefore, the user can specify the processing to be performed by the electronic device.

An electronic device system of the present invention is an electronic device system comprising: a first electronic device including a first USB connector for a USB 3.0 interface having nine terminals from a first terminal to a ninth terminal; and a second electronic device including a second USB connector for a USB 3.0 interface having nine terminals from a first terminal to a ninth terminal. The first electronic device and the second electronic device are connected through the first USB connector and the second USB connector. The first electronic device includes a storage unit for storing BIOS data, and the storage unit is configured to be accessible from an external device through at least one terminal among the fifth to the ninth terminals in the first USB connector. The second electronic device includes: a data storage unit storing BIOS data; and a writing unit that sends out the BIOS data stored in the data storage unit to the first electronic device through at least one terminal among the fifth to the ninth terminals in the second USB connector, and writes the BIOS data to the storage unit of the first electronic device.

According to the present invention, in the two electronic devices connected through the USB connectors, one electronic device is able to write BIOS data to the storage unit of the other electronic device by using one or multiple terminals among the fifth to the ninth terminals of the USB connectors.

In the present invention, it becomes possible to write and rewrite the data to the storage unit of the electronic device, while maintaining compatibility with the USB standard. For example, it is possible to write and rewrite the BIOS data to the storage unit for storing the BIOS data.

The above and further objects and features will more fully be apparent from the following detailed description with accompanying drawings.

BRIEF DESCRIPTION OF THE SEVERAL VIEWS OF THE DRAWINGS

FIG. 2 is a flowchart showing a procedure of processing performed by a USB compatible device according to the present embodiment.

DETAILED DESCRIPTION

Figure 1:
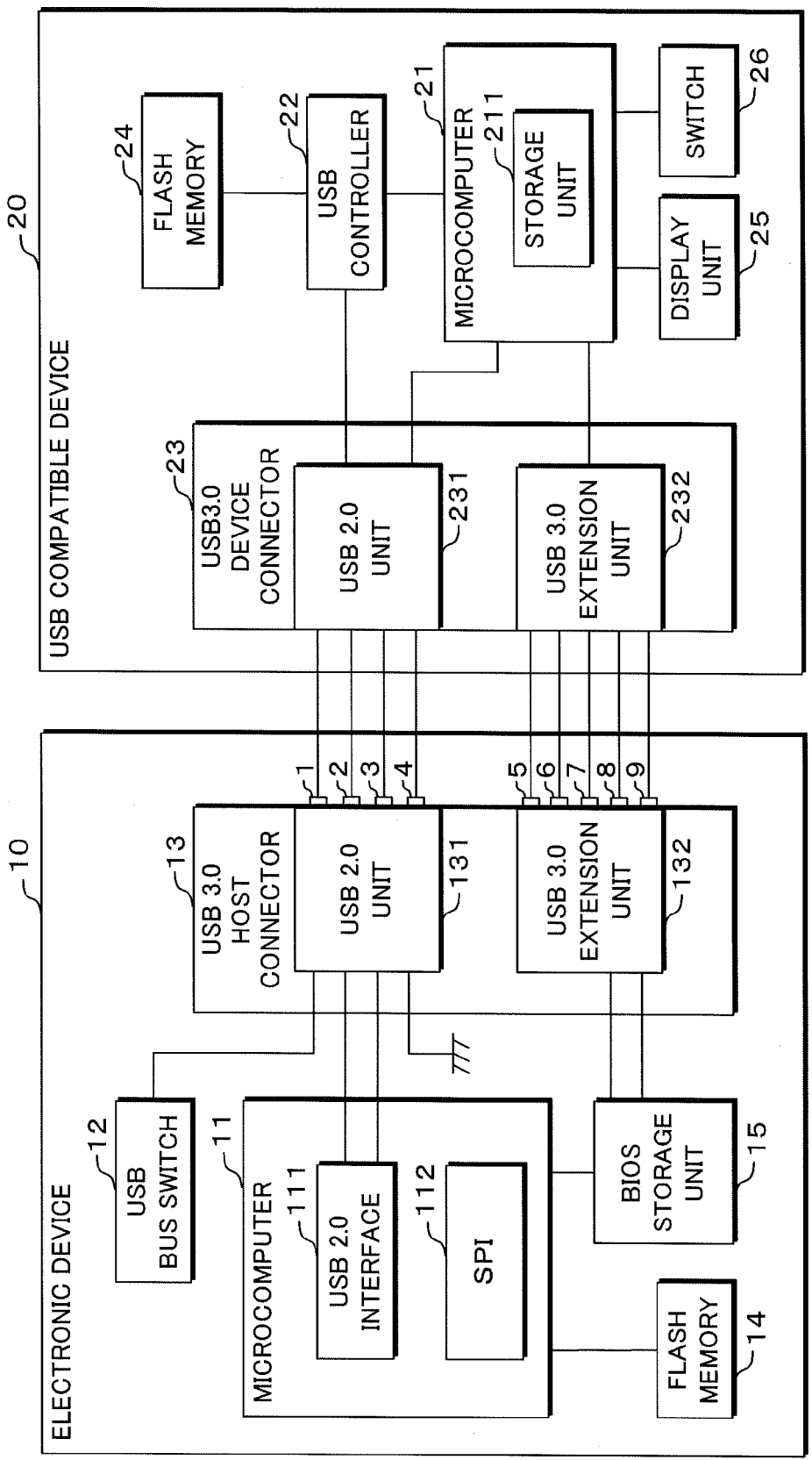
FIG. 1 is a block diagram showing a configuration of an electronic device system according to the present embodiment.

The following will describe in detail the present invention with reference to the drawings illustrating embodiments. FIG. 1 is a block diagram showing a configuration of the electronic device system according to the present embodiment. The electronic device system of the present embodiment includes an electronic device 10 as well as a USB compatible device (electronic device) 20 that is connected to the electronic device 10 via USB connectors 13, 23. Besides the USB compatible device 20, the electronic device 10 can also be connected to a USB 2.0 device via the USB connector 13.

The electronic device 10 and the USB compatible device 20, for example, can be connected with each other via the connector shaped USB connectors 13,23 that meet the USB 3.0 standard having nine terminals from a terminal 1 (first terminal) to a terminal 9 (ninth terminal). Besides the configuration in which the USB 3.0 host connector 13 is connected to the USB 3.0 device connector 23 via a cable, another configuration may also be employed in which the USB 3.0 device connector 23 is directly connected to the USB 3.0 host connector 13 without a cable. Further, when the USB 2.0 device is connected to the electronic device 10, the connection is made via four terminals from the terminal 1 to the terminal 4, among the terminals from the terminal 1 to the terminal 9 of the USB connector 13.

In the following description, the USB compatible device 20 is a device (USB compatible device which has compatibility with the USB 2.0 standard) which is able to perform data transfer based on the USB 2.0 standard and perform original data communications. Moreover, the USB 2.0 device is a device which can perform data transfer based on the USB 2.0 standard.

The electronic device 10 includes a microcomputer 11, a USB bus switch 12, the USB 3.0 host connector (USB connector) 13, a flash memory 14, a BIOS storage unit 15, and so forth. The USB 3.0 host connector 13 has a USB 2.0 unit 131 and a USB 3.0 extension unit 132. The terminals from the terminal 1 to the terminal 4 correspond to the USB 2.0 unit 131, while the terminals from the terminal 5 to the terminal 9 correspond to the USB 3.0 extension unit 132.

The microcomputer 11 is constituted by an integrated circuit which controls the electronic device 10, and has a USB 2.0 interface 111, an SPI (Serial Peripheral Interface) 112, and so forth. The USB 2.0 interface 111 is connected to the USB 2.0 unit 131 of the USB 3.0 host connector 13, and performs the data communications through the USB 2.0 unit 131. Moreover, the microcomputer 11 may have an I2C interface (I2C: Inter-Integrated Circuit), for example, and may have a composition of performing the data communications via the USB 3.0 extension unit 132 by this interface.

The flash memory 14 is connected to the microcomputer 11, and the microcomputer 11 can read the information stored in the flash memory 14, for example, information such as the MAC address which shows the substrate in which the microcomputer 11 was mounted. Moreover, the BIOS storage unit 15 is connected to the microcomputer 11, and the microcomputer 11 can read the information stored in the BIOS storage unit 15. The BIOS storage unit 15 is an SPI flash memory, for example. In the electronic device 10 of the present embodiment, the BIOS storage unit 15 is connected to the USB 3.0 extension unit 132 of the USB 3.0 host connector 13, and can be accessed from an external device through one or multiple terminals among the terminals 5 to 9 of the USB 3.0 extension unit 132.

The USB compatible device 20 is a device which has compatibility with the USB 2.0 standard, and includes a microcomputer 21, a USB controller 22, the USB 3.0 device connector (USB connector) 23, a flash memory 24, a display unit 25, a switch 26, and so forth. The USB 3.0 device connector 23 of the USB compatible device 20 has a USB 2.0 unit 231 and a USB 3.0 extension unit 232. The terminals from the terminal 1 to the terminal 4 correspond to the USB 2.0 unit 231, while the terminals from the terminal 5 to the terminal 9 correspond to the USB 3.0 extension unit 232.

The microcomputer 21 is constituted by an integrated circuit which controls the USB compatible device 20. Though not illustrated, the microcomputer 21 has a USB 2.0 interface and an I2C interface, and performs data communications with an external device (electronic device 10) through the USB 3.0 device connector 23. The storage unit (data storage unit) 211 is built in the microcomputer 21. The USB controller 22 is connected to the microcomputer 21, and when the microcomputer 21 controls operation of the USB controller 22, the information stored in the flash memory 24, for example, can be sent to the external device through the USB 3.0 device connector 23.

The USB compatible device 20 uses the USB 3.0 extension unit 232 from the terminal 5 (the fifth terminal) to the terminal 9 (the ninth terminal), when connected to the electronic device 10, and then performs processing of reading the BIOS data stored in the BIOS storage unit 15 of the electronic device 10 and processing of writing the BIOS data to the BIOS storage unit 15. Specifically, the microcomputer (sending-out unit) 21 of the USB compatible device 20 communicates with the electronic device 10 using one or multiple terminals among the terminals 5 to 9. In addition, the BIOS data written to the BIOS storage unit 15 is stored in the storage unit 211 of the microcomputer 21. Moreover, the microcomputer (judgment unit) 21 of the USB compatible device 20 compares the BIOS data read from the BIOS storage unit 15 of the electronic device 10 with the data (BIOS data) stored in the storage unit 211, and judges whether they match.

The switch 26 is a receiving unit which receives, from a user, instructions for specifying the processing to be executed by the USB compatible device 20 (microcomputer 21), and notifies microcomputer 21 of the processing received according to the user's operation. The microcomputer 21 can thereby perform processing in accordance with the user's instructions. The switch 26 corresponds to a physical switch which can change the processing for the number of processes that can be specified by the user, and may be a sliding switch, a push button switch and the like. In the present embodiment, the user can specify, via the switch 26, processing such as the processing related to normal operations, the processing of writing the BIOS data to the BIOS storage unit 15 of the electronic device 10, and the processing of comparing the BIOS data read from the BIOS storage unit 15 with the data stored in the storage unit 211 (judgment processing).

The display unit (notification unit) 25 is a seven-segment display, for example, and notifies a user of the operating state of the USB compatible device 20 using a corresponding number. The display unit 25 of the present embodiment displays "1," when the microcomputer 21 is writing the BIOS data to the BIOS storage unit 15 of the electronic device 10. Moreover, when the result of comparison between the BIOS data read from the BIOS storage unit 15 and the data stored in the storage unit 211 is in agreement, the display unit 25 displays "2," and displays "3" when not in agreement. The manner of displaying by the display unit 25 is not limited to the above example. In the cases where the BIOS data is being read from the BIOS storage unit 15, where the comparison processing between the BIOS data read from the BIOS storage unit 15 and the data stored in the storage unit 211 is in progress, and also where the USB compatible device 20 is performing normal operations, for example, the display unit 25 may display corresponding numbers respectively. Note that another configuration may also be employed in which a loudspeaker is used, besides the display unit 25, to notify a user of the operating state of the USB compatible device 20 by changing the output sound.

The example of FIG. 1 illustrates the configuration in which the microcomputer 11 is mounted as a unit having a USB host controller. The present invention is, however, not limited to the above example, and may also be applied to the configuration in which a unit having a USB host controller is mounted, such as for the SOC (System On a Chip) or the Southbridge chip set.

FIG. 2 is a flowchart showing a procedure of processing performed by the USB compatible device 20 according to the present embodiment. In the following description, the microcomputer 21 is used as the subject of processing. Moreover, in the USB compatible device 20, it is assumed that the user operates the switch 26 to give instructions for executing the processing of writing the BIOS data to the BIOS storage unit 15 of the electronic device 10.

When connected to the electronic device 10, the microcomputer 21 starts the processing of writing the BIOS data stored in the storage unit 211 to the BIOS storage unit 15 of the electronic device 10 through the USB 3.0 extension unit 232 (S1). By displaying "1" on the display unit 25, the microcomputer 21 notifies the fact that the BIOS data is being written (S2). The microcomputer 21 judges whether the writing of the BIOS data to the BIOS storage unit 15 has completed or not (S3), and when not having completed (S3: NO), it continues notifying the fact that the BIOS data is being written (S2).

When the writing of BIOS data has completed (S3: YES), the microcomputer 21 reads out BIOS data from the BIOS storage unit 15 of the electronic device 10, and judges whether or not the read BIOS data matches with the BIOS data stored in the storage unit 211 (S4). When they match (S4: YES), by displaying "2" on the display unit 25, the microcomputer 21 notifies that the writing of BIOS data has completed normally (S5), and ends the processing. When, on the other hand, they do not match (S4: NO), by displaying "3" on the display unit 25, the microcomputer 21 notifies that the writing of BIOS data has failed (S6), and ends the processing. The microcomputer 21 may execute the writing of BIOS data again when having failed.

In the description above, the processing to be performed by the USB compatible device 20 when a user specifies the execution of the processing of writing the BIOS data to the BIOS storage unit 15 of the electronic device 10 through the switch 26 is described. When the user, for example, specifies the execution of comparison processing between the BIOS data read from the BIOS storage unit 15 of the electronic device 10 and the data stored in the storage unit 211 of the microcomputer 21 through the switch 26, the USB compatible device 20 may perform the comparison processing. Then, when the data do not match with each other as a result of the comparison, the USB compatible device 20 may perform the processing of writing the BIOS data to the BIOS storage unit 15 of the electronic device 10.

Moreover, when BIOS data is written to the BIOS storage unit 15 of the electronic device 10, the USB compatible device 20 may obtain an information for specifying the electronic device 10 to which the BIOS data has been written, and may store the information in the storage unit 211 or the flash memory 24. By using this information, the electronic device to which BIOS data has been written by the USB compatible device 20, or has been updated can be specified. Note that, as the information for specifying the electronic device 10 to which the BIOS data has been written, the MAC Address stored in the flash memory 14 of the electronic device 10 can be used, for example.

It is also possible for the USB compatible device 20 to be provided with a power supply unit so as to operate with the electric power supplied from its own power supply unit. This allows BIOS data to be written to the BIOS storage unit 15 of the electronic device 10 even in the case where electric power is not supplied to the electronic device 10, where the electronic device 10 cannot supply electric power to the USB compatible device 20, or also where the electronic device 10 has not started.

In the embodiment described above, though having described the configuration in which the microcomputer 21 of the USB compatible device 20 writes the BIOS data to the BIOS storage unit 15 of the electronic device 10 through the USB 3.0 extension units 232, 132, it is not limited thereto. For example, when the electronic device 10 updates the contents stored in the BIOS storage unit 15 while performing normal operation, the microcomputer 21 of the USB compatible device 20 may transmit the BIOS data stored in the storage unit 211 to the electronic device 10 along with writing instructions for writing this BIOS data to the BIOS storage unit 15. In such a case, when the microcomputer 11 of the electronic device 10 which received the BIOS data and writing instructions has written the BIOS data to the BIOS storage unit 15 according to the writing instructions, the BIOS data can be upgraded.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An electronic device including a USB connector for a USB 3.0 interface having nine terminals from a first terminal to a ninth terminal, the electronic device comprising:
    a storage unit for storing BIOS data,
    wherein the storage unit is configured to be accessible from an external device through at least one terminal among the fifth to the ninth terminals in the USB connector.

2. An electronic device including a USB connector for a USB 3.0 interface having nine terminals from a first terminal to a ninth terminal, the electronic device comprising:
    a data storage unit storing BIOS data; and
    a sending-out unit that sends out the BIOS data stored in the data storage unit to an external device through at least one terminal among the fifth to the ninth terminals in the USB connector.

3. The electronic device according to claim 2, further comprising a judgment unit that judges whether or not the BIOS data acquired from the external device matches with the BIOS data stored in the data storage unit.

4. The electronic device according to claim 3, further comprising a notification unit that notifies a judgment result by the judgment unit, or whether or not the sending-out unit is sending out the BIOS data stored in the data storage unit to the external device.

5. The electronic device according to claim 3, further comprising a receiving unit that receives a specifying instruction for processing to be performed, among processing including processing of sending out the BIOS data stored in the data storage unit to the external device, and processing of judging whether or not the BIOS data acquired from the external device matches with the BIOS data stored in the data storage unit.

6. An electronic device system comprising:
    a first electronic device including a first USB connector for a USB 3.0 interface having nine terminals from a first terminal to a ninth terminal; and
    a second electronic device including a second USB connector for a USB 3.0 interface having nine terminals from a first terminal to a ninth terminal,
    the first electronic device being connected to the second electronic device through the first USB connector and the second USB connector, wherein
    the first electronic device includes a storage unit for storing BIOS data, the storage unit being configured to be accessible from an external device through at least one terminal among the fifth to the ninth terminals in the first USB connector, and
    the second electronic device includes:
    a data storage unit storing BIOS data, and
    a writing unit that sends out the BIOS data stored in the data storage unit to the first electronic device through at least one terminal among the fifth to the ninth terminals in the second USB connector, and writes the BIOS data to the storage unit of the first electronic device.

* * * * *